United States Patent
Singh et al.

(10) Patent No.: US 11,773,795 B1
(45) Date of Patent: Oct. 3, 2023

(54) GASEOUS FUEL ENGINE AND OPERATING STRATEGY FOR LIMITING PREIGNITION IN PRECHAMBER SPARKPLUG

(71) Applicant: Caterpillar Inc., Peoria, IL (US)

(72) Inventors: Jaswinder Singh, Dunlap, IL (US); Eric Lee Schroeder, Germantown Hills, IL (US); Andrew Joseph Loetz, West Lafayette, IN (US); Ryan Mchael Snodgrass, Fowler, IN (US); Adam Joseph Clute, Lafayette, IN (US); Patrick John Seiler, Peoria, IL (US); Christopher Ronald Gehrke, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/879,992

(22) Filed: Aug. 3, 2022

(51) Int. Cl.
F02D 41/00 (2006.01)
F02B 19/10 (2006.01)
F02B 19/12 (2006.01)
F02D 41/14 (2006.01)

(52) U.S. Cl.
CPC ...... F02D 41/0027 (2013.01); F02B 19/1009 (2013.01); F02B 19/12 (2013.01); F02D 41/0002 (2013.01); F02D 41/1401 (2013.01); F02D 41/1454 (2013.01); F02D 2041/1433 (2013.01); F02D 2200/101 (2013.01)

(58) Field of Classification Search
CPC .. F02B 19/1009; F02B 19/12; F02D 41/0002; F02D 41/0027
See application file for complete search history.

(56) References Cited

U.S. PATENT DOCUMENTS

| 4,140,090 | A | * | 2/1979 | Lindberg | F02B 19/108 123/3 |
| 7,469,662 | B2 | | 12/2008 | Thomas | |
| 8,813,716 | B2 | | 8/2014 | Herold | |
| 9,303,594 | B2 | | 4/2016 | Malfa et al. | |
| 2004/0094134 | A1 | | 5/2004 | Redmond et al. | |
| 2015/0040845 | A1 | * | 2/2015 | Chiera | F02B 19/12 123/445 |
| 2016/0053673 | A1 | * | 2/2016 | Sotiropoulou | F02B 19/12 123/260 |
| 2016/0341105 | A1 | * | 11/2016 | Gu | F02B 19/10 |
| 2017/0167357 | A1 | * | 6/2017 | Maier | F02F 1/40 |
| 2018/0135505 | A1 | * | 5/2018 | Fuchs | F02D 41/0027 |

(Continued)

FOREIGN PATENT DOCUMENTS

| CN | 111219269 A | 6/2020 |
| JP | 2008291726 A | 12/2008 |

(Continued)

*Primary Examiner* — Logan M Kraft
*Assistant Examiner* — Anthony L Bacon
(74) *Attorney, Agent, or Firm* — Brannon Sowers & Cracraft PC

(57) ABSTRACT

Operating a gaseous fuel engine system includes spark-igniting a gaseous hydrogen fuel and air in a prechamber sparkplug to ignite a main charge containing gaseous hydrogen fuel and air in a cylinder. Operating the gaseous fuel engine system also includes determining a preignition condition and conveying cooling air to the prechamber sparkplug based on the preignition condition to limit preignition of gaseous hydrogen fuel and air in the prechamber sparkplug. Related apparatus and control logic is also disclosed.

20 Claims, 3 Drawing Sheets

(56) References Cited

U.S. PATENT DOCUMENTS

| | | | | |
|---|---|---|---|---|
| 2020/0362750 | A1* | 11/2020 | Rabhi | F02B 19/18 |
| 2022/0294191 | A1* | 9/2022 | Gozawa | H01T 13/06 |
| 2022/0341371 | A1* | 10/2022 | Malischewski | F02D 41/0027 |

FOREIGN PATENT DOCUMENTS

| | | | |
|---|---|---|---|
| JP | 2019039367 | A | 3/2019 |
| KR | 102027498 | B1 | 10/2019 |
| WO | 2015066651 | A1 | 5/2015 |

* cited by examiner

GASEOUS FUEL ENGINE AND OPERATING STRATEGY FOR LIMITING PREIGNITION IN PRECHAMBER SPARKPLUG

STATEMENT OF GOVERNMENT INTEREST

This invention was made with government support under Contract No. DE0009422 awarded by the Department of Energy. The government has certain rights in this invention.

TECHNICAL FIELD

The present disclosure relates generally to operating a gaseous fuel engine system on a gaseous hydrogen fuel, and more particularly to limiting preignition in a prechamber sparkplug by conveyance of cooling air to the prechamber sparkplug.

BACKGROUND

Gaseous fuel engines are used globally for diverse purposes ranging from vehicle propulsion to operation of pumps and compressors, to electrical power generation and a variety of other applications. Gaseous fuels, conventionally gaseous hydrocarbon fuels such as natural gas, tend to produce fewer emissions of at least certain types and are generally widely available. In a typical configuration a gaseous fuel such as natural gas is conveyed into a combustion cylinder in an engine and ignited to produce a controlled combustion reaction driving a piston in the engine to rotate a crankshaft. A great many different engine arrangements and operating strategies have been proposed over the decades.

In recent years increased engineering efforts have been directed at the use of various alternative fuels, including gaseous hydrogen fuels. Combustion of hydrogen with air produces few emissions and notably substantially zero so-called greenhouse gas or "GHG" emissions. Exploiting hydrogen as a fuel in reciprocating engines provides a great many new challenges, however. Hydrogen tends to be less energy dense than certain traditional fuels, has a faster flame speed, and may require special storage and handling techniques and apparatus.

Many gaseous fuel engines are spark-ignited, often employing a device known as a prechamber sparkplug. In a prechamber sparkplug spark electrodes are housed within a prechamber that provides a confined volume where a gaseous fuel and air mixture otherwise sometimes difficult to ignite can be more reliably ignited. Upon ignition, hot jets of combusting fuel and air are discharged from ports in the prechamber sparkplug, in turn igniting a larger main charge typically of the same gaseous fuel in a combustion cylinder. Efforts to implement prechamber sparkplugs in gaseous fuel engines operating solely or partly upon gaseous hydrogen fuels have created a variety of still further challenges. One known engine design employing spark-ignition in a prechamber is set forth in U.S. Pat. No. 8,813,716 to Herold.

SUMMARY

In one aspect, a method of operating a gaseous fuel engine system includes spark-igniting a gaseous hydrogen fuel (H2) and air in a prechamber sparkplug fluidly connected to a cylinder in an engine, and igniting a main charge containing H2 and air in the cylinder via the spark-ignited H2 and air in the prechamber sparkplug. The method further includes determining a preignition condition of the gaseous fuel engine system, conveying cooling air through a cooling air conduit to the prechamber sparkplug based on the determining a preignition condition, and limiting preignition of H2 and air in the prechamber sparkplug based on the conveying cooling air.

In another aspect, an ignition system for a gaseous fuel engine includes a prechamber sparkplug, a cooling air conduit fluidly connected to the prechamber sparkplug, and a cooling air valve within the cooling air conduit. The ignition system further includes a preignition controller in control communication with the cooling air valve and structured to determine a preignition condition of the gaseous fuel engine system, and to command an adjustment to a position of the cooling air valve based on the determined preignition condition to vary a flow of cooling air through the cooling air conduit to the prechamber sparkplug. The preignition controller is further structured to limit preignition of a gaseous fuel and air in the prechamber sparkplug based on the varying of the flow of cooling air.

In still another aspect, a preignition control system for a gaseous fuel engine system includes a preignition controller structured to monitor a plurality of engine operating parameters on the basis of each of which a preignition condition of the gaseous fuel engine system is dependent, and to determine a preignition condition of the gaseous fuel engine system based upon the monitored plurality of engine operating parameters. The preignition controller is further structured to command an adjustment to a position of a cooling air valve based on the determined preignition condition, such that a flow of cooling air through a cooling air conduit to a prechamber sparkplug is varied to modulate a temperature of the prechamber sparkplug.

DETAILED DESCRIPTION

Figure 1:
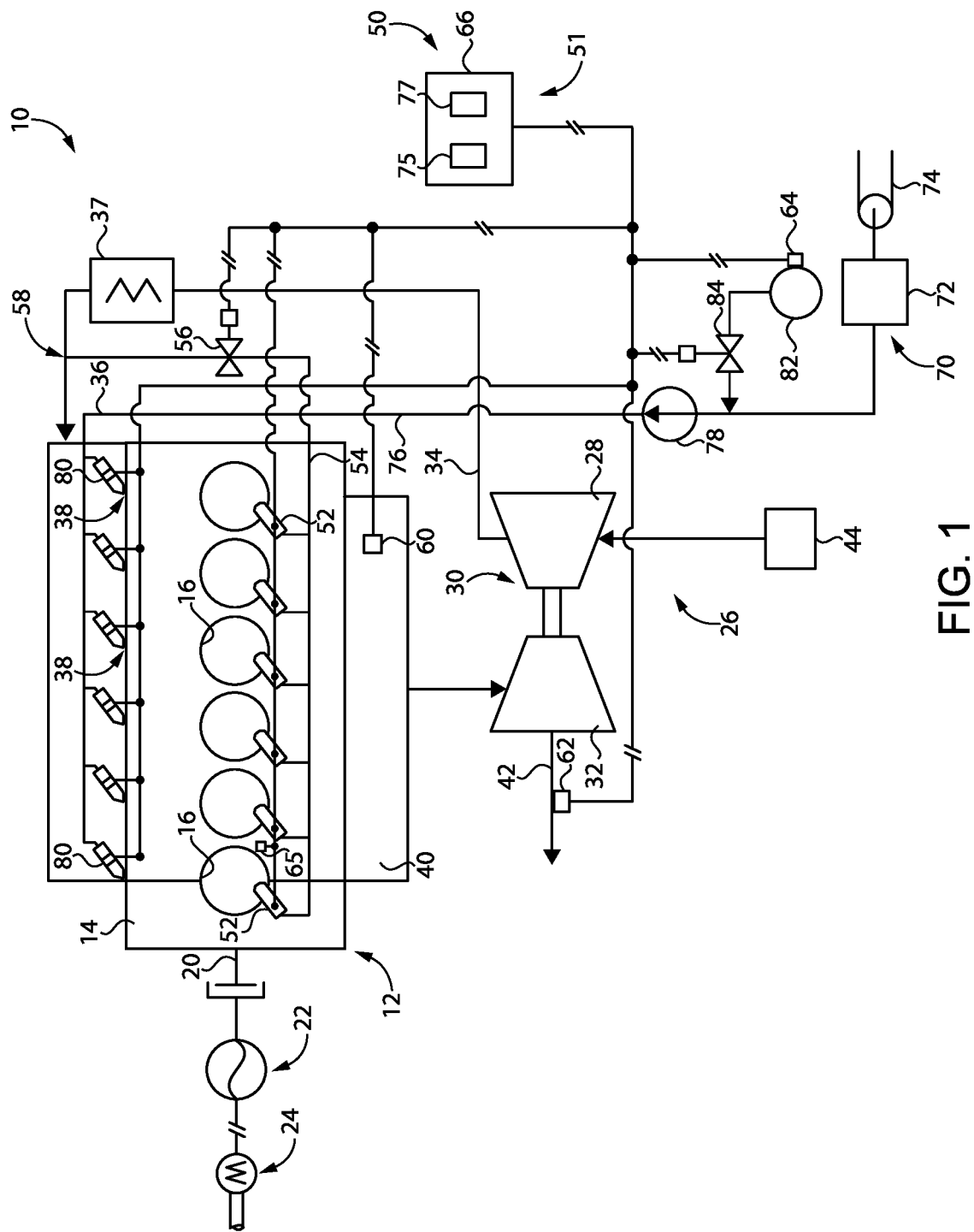
FIG. 1 is a diagrammatic view of a gaseous fuel engine system, according to one embodiment.
Figure 2:
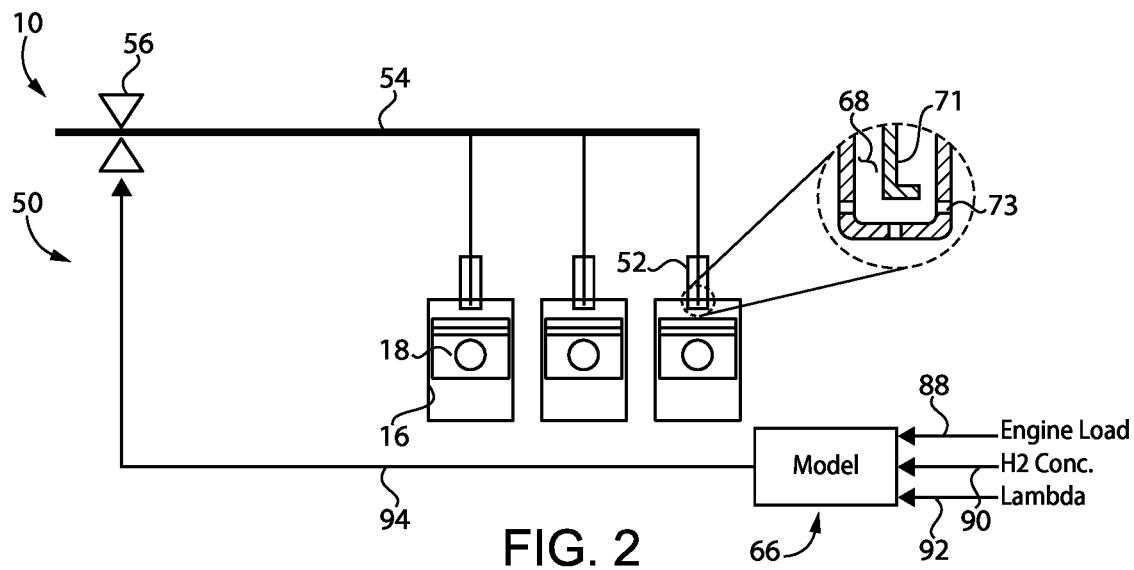
FIG. 2 is a functional diagram, including a detailed enlargement, of portions of the engine system of FIG. 1.

Referring to FIG. 1, there is shown a gaseous fuel internal combustion engine 10, according to one embodiment. Engine system 10 includes a gaseous fuel engine 12 having an engine housing 14 with a plurality of combustion cylinders 16 formed therein. As shown in FIG. 2, a plurality of pistons 18 are positioned within each cylinder 16. Pistons 18 are movable between a top-dead-center position and a bottom-dead-center position in a generally conventional manner, and typically in a four-stroke pattern. Engine 12 also includes a driveshaft 20 rotatable to power a load 22 such as an electrical generator. Electrical generator 22 can produce electrical power for any conceivable purpose, including operating an electric motor 24, or for feeding electrical power to a local or regional electrical grid. Cylinder 16 can include any number of cylinders in any suitable arrangement such as an in-line pattern, a V-pattern, or still another.

Engine system 10 also includes an intake system 26. Intake system 26 receives a feed of intake air from a filtered air inlet 44 and compresses the air in a compressor 28 of a turbocharger 30. Turbocharger 30 also includes a turbine 32 rotated by way of a flow of exhaust from engine 12 according to well-known principles. Intake system 26 also includes an intake conduit 34 extending to an intake manifold 36 attached to engine housing 14. An exhaust manifold 40 receives exhaust from cylinders 16 and conveys the same to turbine 32 and to an exhaust conduit 42 connecting to an exhaust stack or a tailpipe, for instance. An aftercooler 37 is within intake conduit 34 and cools pressurized air received from compressor 28.

Engine system 10 also includes an ignition system 50 having a preignition control system 51, and a fuel system 70. Fuel system 70 may include a filter 72 and/or other equipment that receives a feed of a gaseous hydrocarbon fuel (HC) from a line gas supply 74 or the like. Fuel system 70 also includes one or more fuel pressurization pumps 78 that pressurize gaseous fuel for delivery to cylinders 16 by way of a plurality of gaseous fuel injectors 80. In the illustrated embodiment injectors 80 include port injectors each positioned to inject gaseous fuel at an intake port 38 of engine 12. In other embodiments gaseous fuel may be conveyed to engine 12 by way of direct injectors each positioned to extend into one of cylinders 16. Still other arrangements may include fumigation admission of gaseous fuel, such as by way of an admission valve positioned upstream of compressor 28 to admit gaseous fuel into intake conduit 34. Various combinations of port injection, direct injection, intake manifold injection, and fumigation are within the scope of the present disclosure.

Gaseous hydrocarbon fuel within the context of the present disclosure can include natural gas, propane, ethane, landfill gas, biogas, various blends of these, and still others. Fuel system 70 may also include a gaseous hydrogen fuel supply 82. Gaseous hydrogen fuel supply 82 may include pressurized gaseous molecular hydrogen, for instance, or various blends of gaseous molecular hydrogen and other fuels with gaseous molecular hydrogen typically but not necessarily predominating. In some embodiments, line gas supply 74 could supply a blend of gaseous hydrogen fuel and gaseous hydrocarbon fuel. Gaseous hydrogen fuel (H2) can be conveyed into fuel conduit 76 by way of a hydrogen fuel admission valve 84. In this arrangement fuel conduit 76 carries a mixture of H2 and HC to injectors 80. In other embodiments port injectors or direct injectors could be used to inject H2, and HC could be delivered by way of fumigation. Still other arrangements could include port injection of HC and direct injection of H2, or still some other alternative.

Engine system 10 also includes ignition system 50 and preignition control system 51 as noted above. Ignition system 50 may include a plurality of prechamber sparkplugs 52, each extending into one of cylinders 16. Those skilled in the art will be familiar with prechamber sparkplug configurations, and FIG. 2 illustrates in a detailed enlargement a prechamber sparkplug 52 having a prechamber 68 with one or more spark electrodes 71 therein and fluidly connected to a cylinder 16 by way of a plurality of ports 73. In this arrangement H2 and air are conveyed from cylinder 16 into prechamber 68 via at least one port 73 fluidly connecting prechamber 68 to cylinder 16, typically during a compression stroke of piston 18 in cylinder 16. Spark-ignition of H2 and air, including H2 blended with another gaseous fuel, in prechamber sparkplug 52, ignites a main charge containing H2 and air in cylinder 16. The fuel of the main charge may be H2 only, H2 and HC blended for combustion in cylinder 16 together, or even at times HC only.

Ignition system 50 also includes a cooling air conduit 54 fluidly connected to each prechamber sparkplug 52. In the illustrated embodiment cooling air conduit 54 receives a flow of pressurized air from intake conduit 34 by way of a port 58 that is located downstream of aftercooler 37, meaning fluidly between aftercooler 37 and intake manifold 36. Cooling air conduit 54 may directly fluidly connect to prechamber 68 in each prechamber sparkplug 52 and provides a flow of cooling air to modulate a temperature of prechamber sparkplug 52 limiting preignition tendency as further discussed herein. Ignition system 50 also includes a cooling air valve 56 within cooling air conduit 54. Cooling air valve 56 may be electrically actuated and can be used to selectively turn on, turn off, or otherwise vary a flow of cooling air directly into each respective prechamber 68 as also further discussed herein. Conveying of cooling air may include conveying the cooling air to prechamber 68 while a gas exchange valve for cylinder 16 is open, and typically during an intake stroke of piston 20 in which case an intake valve is open. As shown in FIG. 2 each of a plurality of cooling air lines of cooling air conduit 54 opens to a prechamber in each of a plurality of prechamber sparkplugs.

Ignition system 50, more particularly preignition control system 51, further includes a preignition controller 66 including a processor 75 and a computer readable memory 77. Processor 75 can include any device having a suitable central processing unit such as a microcontroller or a microprocessor. Computer readable memory 77 may include RAM, ROM, DRAM, SDRAM, EEPROM, FLASH, a hard drive, or any other suitable volatile or non-volatile computer readable memory storing program control instructions which, when executed by processor 75, cause preignition control system 51 to perform the functions described herein.

Preignition controller 66 is in control communication with cooling air valve 56 and structured to monitor a plurality of engine operating parameters on the basis of each of which a preignition condition of gaseous fuel engine system 10 is dependent. "Dependent" as used in this context can be understood to mean varying as a function of, directly, or indirectly. Thus, the plurality of engine operating parameters include parameters that influence a preignition condition of engine system 10. A preignition condition can be understood to include actual preignition, meaning ignition of a fuel and air mixture in prechamber 68 prior to a crank angle timing at which ignition is desired. H2 has a generally low ignition energy, and can ignite by way of hot surfaces of a prechamber sparkplug where no spark has been produced. The present disclosure reflects insights relating to a tendency of H2 and air to ignite prior to a desired timing as would otherwise be dictated by a timing of production of an electrical spark in respective prechambers. By supplying cooling air selectively directly into each respective prechamber 68, a temperature of spark electrode 71, a prechamber housing, or other associated structures can be controlled to limit a risk of ignition occurring at an undesired timing. A preignition condition can also include a preignition risk condition. Thus, while in some instances actual preignition may be directly observed, in other instances a risk of or tendency toward preignition can be determined by preignition controller 66 without direct observation of preignition, as further discussed herein. For purposes of directly detecting preignition and potentially other engine operating parameters, one or more in-cylinder pressure sensors 65 may be provided exposed to a fluid pressure of one or more of cylinders 16. By detecting pressures in each cylinder 16, pressure sensor 65 can signal to preignition controller 66 that preignition has occurred, based on a timing of pressure rise, for instance. As suggested above, other engine operating parameters having known or determinable relationships with preignition risk can also be evaluated and acted upon by preignition controller 66.

To this end, preignition control system 51 may further include an engine speed sensor 60, a lambda sensor 62 in or associated with exhaust conduit 42, an H2 level tank sensor 64, and potentially still other sensors, at least some of which produce sensor data of an engine operating parameter on the basis of which a preignition condition of gaseous fuel engine system 10 is dependent. Preignition controller 66 may also be structured to determine a preignition condition of gaseous fuel engine system 10 based upon one or more of the monitored plurality of engine operating parameters, and to command an adjustment to a position of cooling air valve 56 based on the determined preignition condition to vary a flow of cooling air through cooling air conduit 54 to each respective prechamber sparkplug 52. Based upon commanded adjustment to a position of cooling air valve 56, a flow of cooling air through cooling air conduit 54 is varied to modulate a temperature of the respective prechamber sparkplugs 52 and thereby limit preignition of a gaseous fuel and air in the respective prechamber sparkplugs. Directionally, when preignition is detected or preignition risk is considered high cooling air flow can be initiated or increased. When preignition is not detected or preignition risk is considered low cooling air flow can be stopped or decreased. In general, preignition tendency scales with hydrogen content in fuel, scales with engine load, and scales with air-fuel stoichiometry or lambda.

Focusing now on FIG. 2, there is shown a functional diagram illustrating various inputs to a stored preignition risk model 86 upon computer readable memory 77. As suggested above, determining a preignition condition may include determining a preignition risk condition, thus model 86 may be understood as a stored preignition risk model that is populated with the plurality of monitored operating parameters upon the basis of which the preignition risk condition is dependent. As depicted in FIG. 2, model 86 may be populated with monitored engine load, or one or more other parameters that together are indicative of engine load including engine speed, mass air flow, and potentially others. Engine speed as a separate input may also be used. Model 86 may also be populated with an H2 concentration input 90. H2 concentration input 90 may include an input indicative of H2 concentration in a fuel blend being delivered to engine 12, or indicative of H2 concentration or proportion in a total amount of fuel being combusted in engine 12. An H2 concentration parameter includes any actual or relative value that is directly or indirectly indicative of a proportion of H2 delivered into engine 12. Model 86 may also be populated based on a lambda input 92. In some embodiments model 86 is populated with at least one of an engine speed parameter or an engine load parameter, an H2 concentration parameter, and a lambda parameter. A valve command signal 94, such as an electrical control current command, may be output from preignition controller 66 based on model 86 to cooling air valve 56.

According to this general strategy, during engine operation preignition controller 66 monitors each of a plurality of operating parameters, and based upon stored model 86 determines valve signal or command 94 to turn on cooling air flow, turn off cooling air flow, or otherwise vary cooling air flow to prevent each respective prechamber sparkplug 52 from reaching a high temperature known to be associated with preignition while also not reducing the temperature to a level that would be associated with a risk of misfire or other problems such as undesired combustion phasing. In general terms, preignition will tend to be more likely with relatively higher H2 content in a fuel blend and relatively lower HC. Analogously, relatively lower H2 and higher HC can be associated with a lower likelihood of preignition. Preignition likelihood or risk can also be understood to generally scale with engine load, meaning at higher engine loads preignition is more likely and at lower engine loads preignition is less likely. At a higher lambda value preignition tendency may be lower while at a lower lambda value preignition tendency may be less.

Figure 3:
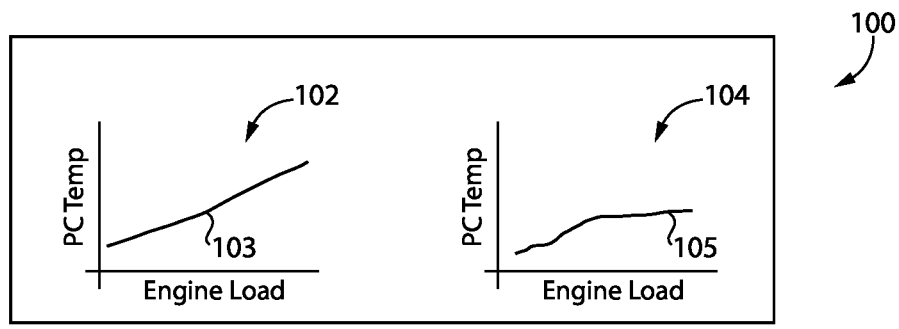
FIG. 3 is a comparative graph illustration of prechamber temperature in comparison to engine load for a known strategy and for a strategy according to the present disclosure.

Referring also now to FIG. 3, there is shown a diagram 100 including a first graph 102 of prechamber temperature in relation to engine load (line 103) and a second graph 104 of prechamber temperature in relation to engine load (line 105). In graph 102 line 103 represents what might be observed in traditional system behavior where engine load generally scales with prechamber temperature. In graph 104 there is shown what might be observed in an optimized system according to the present disclosure where it can be seen that by way of addition of cooling air prechamber temperature can be controlled and to some extent decoupled from engine load. It will be appreciated that by implementing the present disclosure an increase in prechamber temperature with increased engine load can be limited so that engine load range for a given set of operating conditions, including a given H2/HC blend ratio, or pure H2, can potentially be extended without increasing risk of prechamber temperatures likely to lead to preignition.

Figure 4:
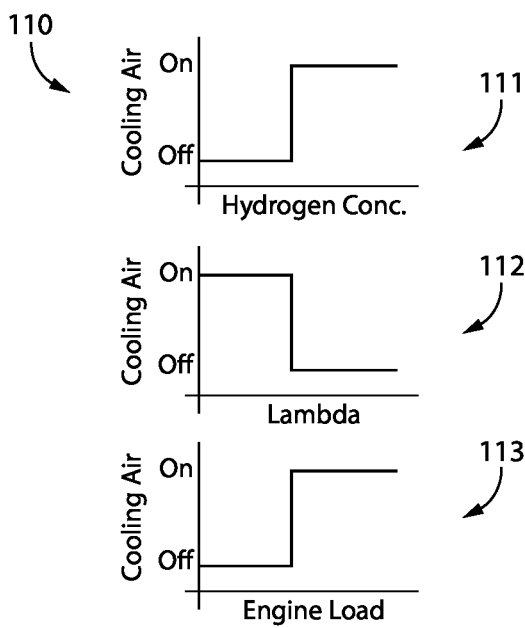
FIG. 4 is a graph illustration of cooling air signal states in relation to different engine system operating parameters.

Referring to FIG. 4, there is shown a chart 110 including a cooling air on/off state shown in comparison to hydrogen concentration in a graph 111, a cooling air on/off state in relation to lambda in a graph 112, and a cooling air on/off state in relation to engine load in a graph 113. It can be noted from FIG. 4 that increased H2 concentration may justify turning cooling air on, increased lambda value may justify turning cooling air off, and increased engine load may justify turning cooling air on. Among the many combinations of hydrogen concentration, lambda, and engine load, cooling air flow can be modulated to maintain prechamber sparkplug temperature within a desired range. Moreover, while in some instances such as where operating on pure H2 or mostly H2 lambda might not need to be considered and H2 concentration and load relied upon, monitoring lambda can assist in operating an engine according to the present disclosure where operating on pure HC or various blends.

INDUSTRIAL APPLICABILITY

Figure 5:
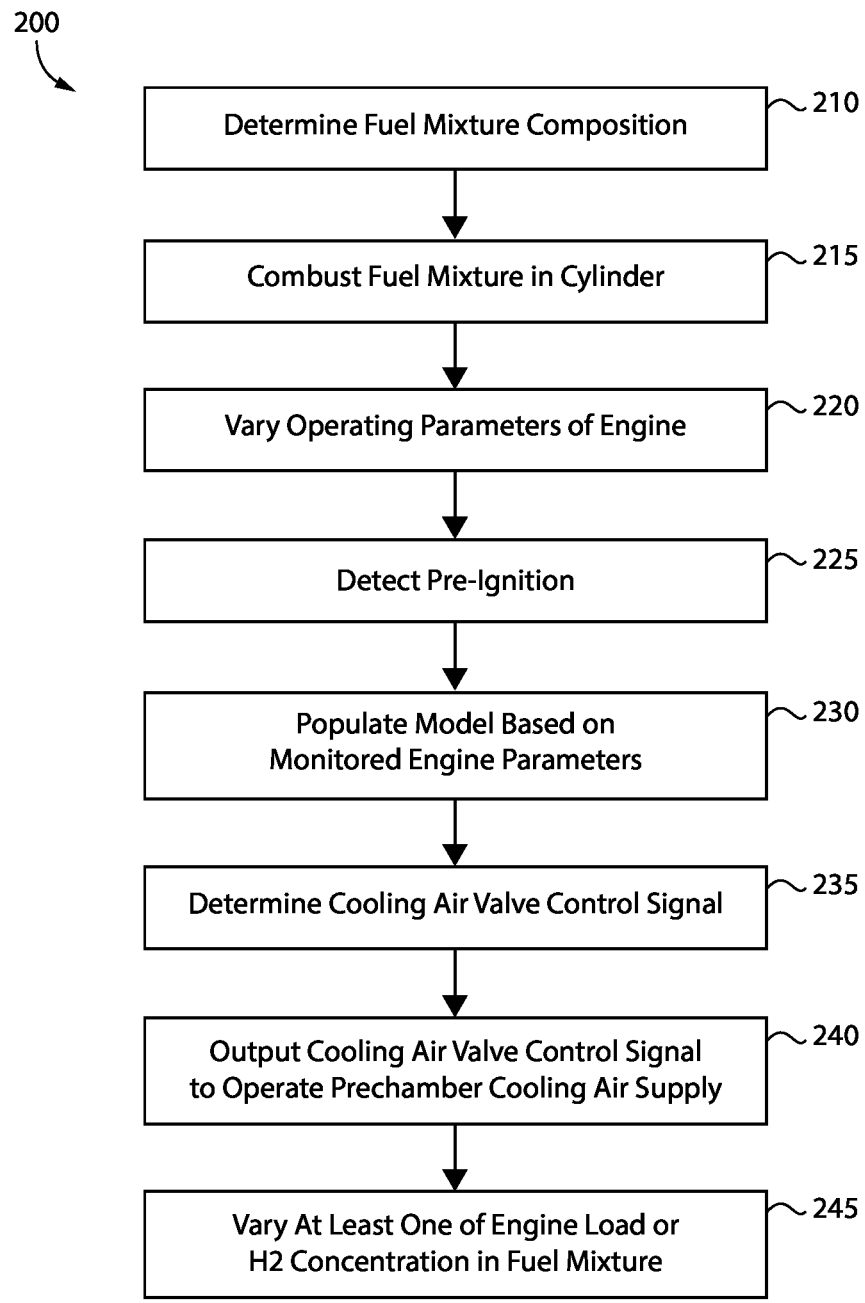
FIG. 5 is a flowchart illustrating example methodology and logic flow, according to one embodiment.

Referring to the drawings generally but focusing also now on FIG. 5, there is shown a flowchart 200 illustrating example methodology and logic flow, according to one embodiment. In flowchart 200 at a block 210 a fuel mixture composition is determined, such as by preignition controller 66 determining a relative proportion of H2 and a relative proportion of HC in a given fuel mixture being delivered to engine system 10. From block 210 the logic advances to a block 215 to combust that fuel mixture in the cylinders. From block 215 flowchart 200 advances to a block 220 to vary operating parameters of the engine. The varied operating parameters could include any of the monitored operating parameters discussed herein as well as others. For instance, at block 210 H2 concentration in a fuel mixture being supplied to the engine could be increased or decreased. Engine load could be increased or decreased.

Air/fuel ratio could be increased or decreased, or various other engine parameters influencing preignition risk or tendency may be varied.

From block 220 flowchart 200 advances to a block 225 to detect preignition. Detecting preignition could include detecting preignition by way of monitoring in-cylinder pressures as discussed herein. The detection of preignition could also include detecting likelihood of preignition or apparent preignition. From block 225 flowchart 200 may advance to a block 230 to populate the stored model based on the various monitored engine parameters. From block 230 flowchart 200 may advance to a block 235 to determine the cooling air valve control signal, such as command or signal 94 depicted in FIG. 2. From block 235 flowchart 200 may advance to a block 240 to output the cooling air valve control signal to operate the prechamber cooling air supply. At block 240 cooling air valve 56 might be opened, closed, moved to a relatively more open position, moved to a relatively less open position, et cetera. From block 240 flowchart 200 may advance to a block 245 to vary at least one of engine load or the H2 concentration in the fuel mixture. From block 245 the logic may return and execute again, or exit, for example.

In view of the present description it will be appreciated that cooling air flow can be varied from one engine cycle to another to modulate the temperature of prechamber components. Cooling air flow might be increased in a given engine cycle relative to a prior engine cycle, then decreased in a subsequent engine cycle to modulate temperature of a prechamber spark plug. Determining a preignition condition or a preignition risk condition associated with a given engine cycle can be performed and cooling air flow adjusted appropriately by way of a first command to adjust a cooling air valve. The cooling air flow might be increased relative to a prior engine cycle. A subsequent preignition condition or preignition risk condition can then be determined associated with a subsequent engine cycle and a subsequent adjustment to cooling air flow performed by way of a subsequent command to adjust a cooling air valve. The cooling air flow might be decreased in a subsequent engine cycle. In this way control system 51 can respond to a wide range of variations in engine load, H2 concentration, AFR, and still other parameters, maintaining prechamber sparkplugs at temperatures where preignition does not occur whilst avoiding excessive cooling.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a gaseous fuel engine system comprising:
    spark-igniting a gaseous hydrogen fuel (H2) and air in a prechamber sparkplug fluidly connected to a cylinder in an engine;
    igniting a main charge containing H2 and air in the cylinder via the spark-ignited H2 and air in the prechamber sparkplug;
    determining a preignition condition of the gaseous fuel engine system;
    conveying cooling air through a cooling air conduit to the prechamber sparkplug based on the determining a preignition condition; and
    limiting preignition of H2 and air in the prechamber sparkplug based on the conveying cooling air.

2. The method of claim 1 further comprising commanding varying a position of a cooling air valve in the cooling air conduit based on the determining a preignition condition.

3. The method of claim 2 wherein the conveying cooling air further includes conveying cooling air from a compressor in an intake conduit of the gaseous fuel engine system directly into a prechamber in the prechamber sparkplug.

4. The method of claim 2 wherein the conveying cooling air includes conveying the cooling air to the prechamber sparkplug while a gas exchange valve for the cylinder is open.

5. The method of claim 3 further comprising conveying the H2 and air into a prechamber in the prechamber sparkplug via at least one port fluidly connecting the prechamber to the cylinder, during a compression stroke of a piston in the cylinder, and wherein the conveying cooling air includes conveying the cooling air to the prechamber sparkplug during an intake stroke of the piston.

6. The method of claim 1 wherein the conveying cooling air includes increasing a flow of the cooling air relative to a prior engine cycle, and further comprising decreasing a flow of the cooling air in a subsequent engine cycle to modulate a temperature of the prechamber sparkplug.

7. The method of claim 1 wherein the determining a preignition condition includes determining a preignition risk condition based on a stored preignition risk model.

8. The method of claim 7 further comprising populating the stored preignition risk model with a plurality of monitored operating parameters upon the basis of which the preignition risk condition is dependent.

9. The method of claim 8 wherein the main charge includes the H2 and a gaseous hydrocarbon (HC) fuel, and the plurality of operating parameters includes an H2 concentration parameter, at least one of an engine speed parameter or an engine load parameter, and a lambda parameter.

10. An ignition system for a gaseous fuel engine comprising:
    a prechamber sparkplug;
    a cooling air conduit fluidly connected to the prechamber sparkplug;
    a cooling air valve within the cooling air conduit; and
    a preignition controller in control communication with the cooling air valve and structured to:
        determine a preignition condition of the gaseous fuel engine system;
        command an adjustment to a position of the cooling air valve based on the determined preignition condition to vary a flow of cooling air through the cooling air conduit to the prechamber sparkplug; and
        limit preignition of a gaseous fuel and air in the prechamber sparkplug based on the varying of the flow of cooling air.

11. The ignition system of claim 10 wherein the prechamber sparkplug includes spark electrodes within a prechamber, and the cooling air conduit opens to the prechamber.

12. The ignition system of claim 10 further comprising a computer readable memory storing a preignition risk model, and the preignition controller is further structured to determine the preignition condition based on the preignition risk model.

13. The ignition system of claim 12 wherein the preignition controller is further structured to populate the preignition risk model with a plurality of engine operating parameters upon which a preignition risk in the gaseous fuel engine system is dependent.

14. The ignition system of claim 13 wherein the plurality of engine operating parameters includes an H2 concentration parameter.

15. The ignition system of claim 14 wherein the plurality of engine operating parameters includes at least one of an engine speed parameter or an engine load parameter, and a lambda parameter.

16. The ignition system of claim 10 wherein the preignition controller is further structured via the varying of the flow of cooling air to increase a flow of the cooling air relative to a prior engine cycle in the gaseous fuel engine system.

17. The ignition system of claim 16 wherein the preignition controller is further structured to:
  determine a subsequent preignition condition; and
  command a subsequent adjustment to a position of the cooling air valve based on the determined subsequent preignition condition to decrease a flow of cooling air through the cooling air conduit to the prechamber sparkplug.

18. A preignition control system for a gaseous fuel engine system comprising:
  a preignition controller structured to:
    monitor a plurality of engine operating parameters on the basis of each of which a preignition condition of the gaseous fuel engine system is dependent;
    determine a preignition condition of the gaseous fuel engine system based upon the monitored plurality of engine operating parameters; and
    command an adjustment to a position of a cooling air valve based on the determined preignition condition, such that a flow of cooling air through a cooling air conduit to a prechamber sparkplug is varied to modulate a temperature of the prechamber sparkplug.

19. The preignition control system of claim 18 further comprising a computer readable memory storing a preignition risk model populated based on the plurality of engine operating parameters.

20. The preignition control system of claim 19 wherein the plurality of engine operating parameters includes an H2 concentration parameter, at least one of an engine speed parameter or an engine load parameter, and a lambda parameter.

* * * * *